United States Patent [19]

Ishihara

[11] Patent Number: 5,438,833
[45] Date of Patent: Aug. 8, 1995

[54] MASTER CYLINDER

[75] Inventor: Kimio Ishihara, Higashimatsuyama, Japan

[73] Assignee: Jidosha Kiki Co., Ltd., Tokyo, Japan

[21] Appl. No.: 219,362

[22] Filed: Mar. 29, 1994

[30] Foreign Application Priority Data

Apr. 16, 1993 [JP] Japan .................. 5-089653

[51] Int. Cl.[6] ............................................. B60T 11/20
[52] U.S. Cl. ........................................ 60/562; 60/588
[58] Field of Search ...................... 60/561, 562, 588; 92/164

[56] References Cited

U.S. PATENT DOCUMENTS

| 2,577,153 | 12/1951 | Pratt et al. | 60/585 |
| 4,455,832 | 6/1984 | Gaiser et al. | 60/562 |
| 4,510,752 | 4/1985 | Gaiser . | |
| 4,945,729 | 8/1990 | Hayashida et al. | 60/562 |

FOREIGN PATENT DOCUMENTS

| 7344518 | 7/1975 | France | 60/585 |
| 58-16952 | 1/1983 | Japan . | |

Primary Examiner—F. Daniel Lopez
Attorney, Agent, or Firm—Jacobson, Price, Holman & Stern

[57] ABSTRACT

A master cylinder (1) has a cylinder housing (2) composed of a body (3) having an opening at one end thereof and a cap (4) screwed into the opening of the body; pistons (6, 7) installed movably and guided and supported by a piston (5) and guide sleeve (10) in the cylinder housing; and pressure chambers (8, 9) in the housing in communication with a reservoir (2, 6) via through holes (13, 14) which are closed to cut off communication between the pressure chambers and the reservoir as the pistons move into the pressure chambers during application of the pistons to send under pressure the fluid in the pressure chambers to an operation system. A piston guide section (17) extending in the radial direction is integrally formed on the inner peripheral surface of the cap, and a passage (25) having one end (25a) open on the sliding surface of the piston (6) and the other end (25b) in communication with the reservoir (26) is formed in the cap.

16 Claims, 3 Drawing Sheets

MASTER CYLINDER

BACKGROUND OF THE INVENTION

The present invention relates to a master cylinder which is used for various brake devices.

One example of a conventional master cylinder is shown in FIG. 4. In the master cylinder of this type, a cylinder housing 51 is constructed by screwing a cap 53 into the opening of a body 52. A piston guide 54 is disposed in the cylinder housing 51, and a piston 55 which is guided and supported by the piston guide 54 is slidably installed. A vertical hole 56 is formed in the piston guide 54, and a passage 58 communicating with an oil reservoir 57 is open to a pressure chamber 59 when the master cylinder is not operated.

On the peripheral surface of the piston 55 is formed a through hole 60. When the through hole 60 coincides with the vertical hole 56 of the piston guide 54, the oil reservoir 57 communicates with the pressure chamber 59. Therefore, if the oil in the pressure chamber 59 becomes insufficient, oil is supplied from the oil reservoir 57 to the pressure chamber 59. An annular seal member 61 is installed on the end surface of the piston guide 54 on the pressure chamber 59 side.

With the master cylinder of this type, the piston 55 is pushed into the pressure chamber 59 by a push rod, not shown. When the through hole 60 of the piston 55 passes through the annular seal member 61, the through hole 60 is closed, thereby the communication between the through hole 60 and the vertical hole 56 of the piston guide 54 is cut off. Therefore, when the piston 55 is further pushed into the pressure chamber 59, the oil in the pressure chamber 59 is sent under pressure to a brake system of a not illustrated wheel cylinder, etc. On the peripheral surface of the body 52 is installed a mount 62 for a not illustrated brake booster.

In the conventional master cylinder described above, however, the cap 53 and the piston guide 54 are constructed separately, so that a clearance is formed at position D where the outer peripheral surface of the piston guide 54 fits on the inner peripheral surface of the cap 53, as well as at position A where the brake booster (not shown) is installed to the mount 62 of the body 52, position B where the cap 53 is screwed in the body 52, and position C where the outer peripheral surface of the piston 55 slides on the inner peripheral surface of the piston guide 54. Therefore, when the master cylinder is mounted on the brake booster, which is a mating member, not shown, the concentricity with the brake booster cannot be achieved sufficiently due to the clearances at the four positions, thereby the output efficiency is lowered. With the conventional master cylinder, the number of parts increases because of the presence of the piston guide 54; accordingly, the number of working processes increases and the assembly work becomes complicated. Therefore, the conventional master cylinder has the disadvantages that it is not suitable for mass production and the part cost is high.

BRIEF SUMMARY OF THE INVENTION

Accordingly, an object of the present invention is to provide a master cylinder which overcomes the above problems and in which the concentricity in installing the master cylinder to a mating member is improved and the production cost can be lowered.

To achieve the above object, the present invention provides a master cylinder comprising a cylinder housing composed of a body having an opening at one end thereof and a cap screwed into the opening of the body; pistons which are installed movably and guided and supported by a piston guide in the cylinder housing; pressure chambers in the housing which are in communication with a reservoir via through holes formed on the peripheral surfaces of the pistons; the through holes being closed to cut off the communication between the pressure chambers and the reservoir as the pistons move into the pressure chambers; and the pistons being pushed into the pressure chambers to send under pressure the fluid in the pressure chambers to an operation system, wherein a piston guide section extending in the radial direction is integrally formed on the inner peripheral surface of the cap, and a passage whose one end is open on the sliding surface of the piston and whose other end communicates with the reservoir is formed in the cap.

With the master cylinder in accordance with the present invention, a piston guide section for guiding and supporting the piston is incorporated in the cap screwed into the opening of the body of the cylinder housing, and a passage whose one end is open on the sliding surface of the piston and whose other end communicates with the reservoir is formed in the cap. Therefore, one of the points where a clearance is required can be eliminated compared with the conventional master cylinder, and the number of parts can be reduced.

As described above, a master cylinder in accordance with the present invention comprises a cylinder housing composed of a body having an opening at one end thereof and a cap screwed into the opening of the body; pistons which are installed movably and guided and supported by a piston guide in the cylinder housing; and pressure chambers in the housing which are in communication with a reservoir via through holes formed on the peripheral surfaces of the pistons. The through holes are closed to cut off the communication between the pressure chambers and the reservoir as the pistons move into the pressure chambers, and the pistons are pushed into the pressure chambers to send under pressure the fluid in the pressure chambers to an operation system. The piston guide section extending in the radial direction is integrally formed on the inner peripheral surface of the cap, and a passage whose one end is open on the sliding surface of the piston and whose other end communicates with the reservoir is formed in the cap. Therefore, the number of points of clearance can be reduced and the concentricity in installing the master cylinder to a mating member can be improved, as compared with the conventional master cylinder. Thus, with the master cylinder in accordance with the present invention, there is no possibility of occurrence of high sliding resistance, so that the output efficiency can be enhanced, and the durability can be improved.

The master cylinder of the present invention incorporates the piston guide section in the cap, so that the number of parts is decreased. Therefore, the workability of assembly is improved, and the cost is lowered. In addition, the inlet passage can be located at a position close to the reservoir, so that the response can be improved with a simple construction.

BRIEF DESCRIPTION OF THE DRAWINGS

The invention will now be described in detail with reference to the accompanying drawing, wehrein.

DETAILED DESCRIPTION OF PREFERRED EMBODIMENT

An embodiment of the present invention will be described in detail below with reference to the drawings.

Figure 1:
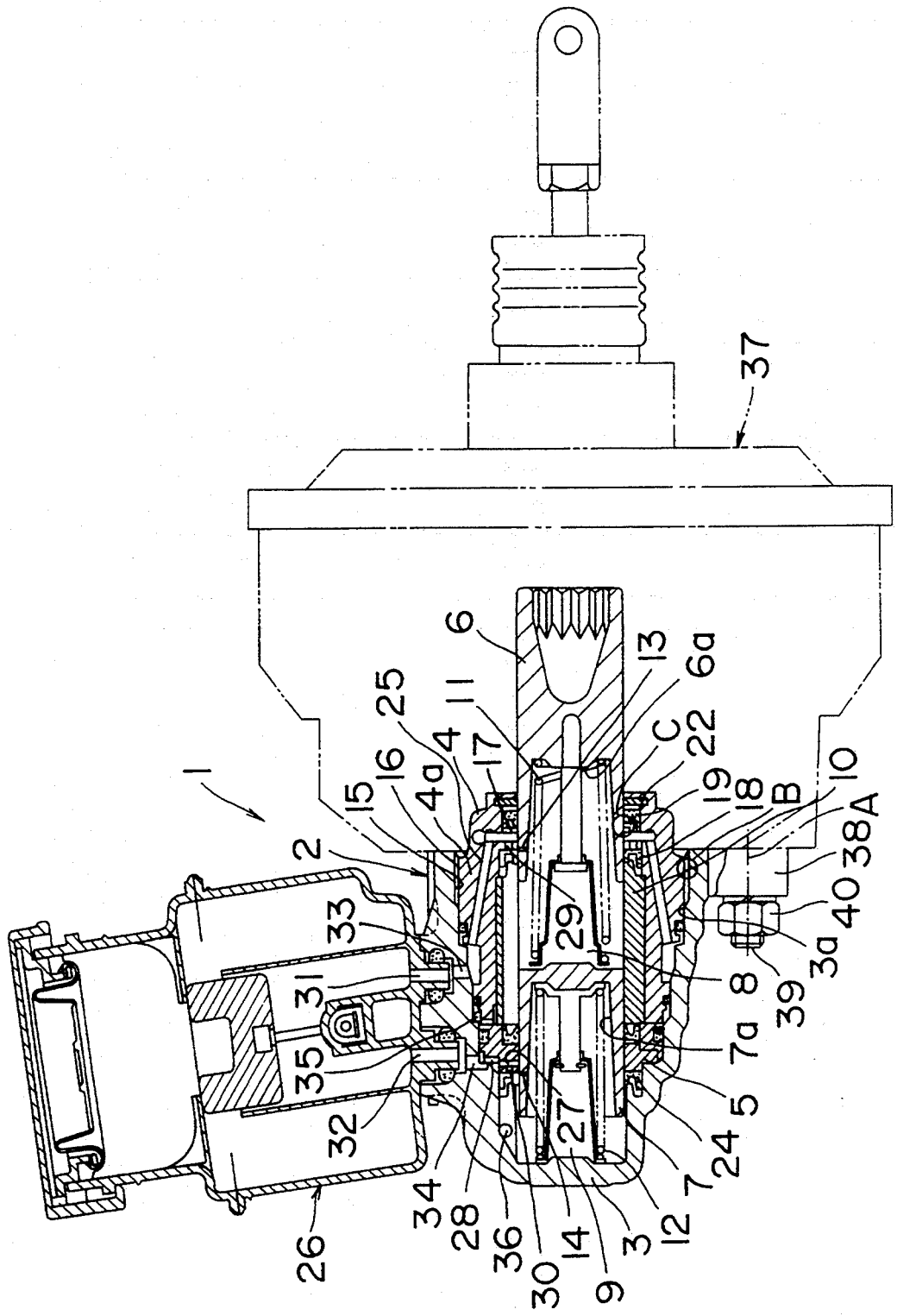
FIG. 1 is a cross-sectional view of a master cylinder in accordance of one embodiment of the present invention.
Figure 2:
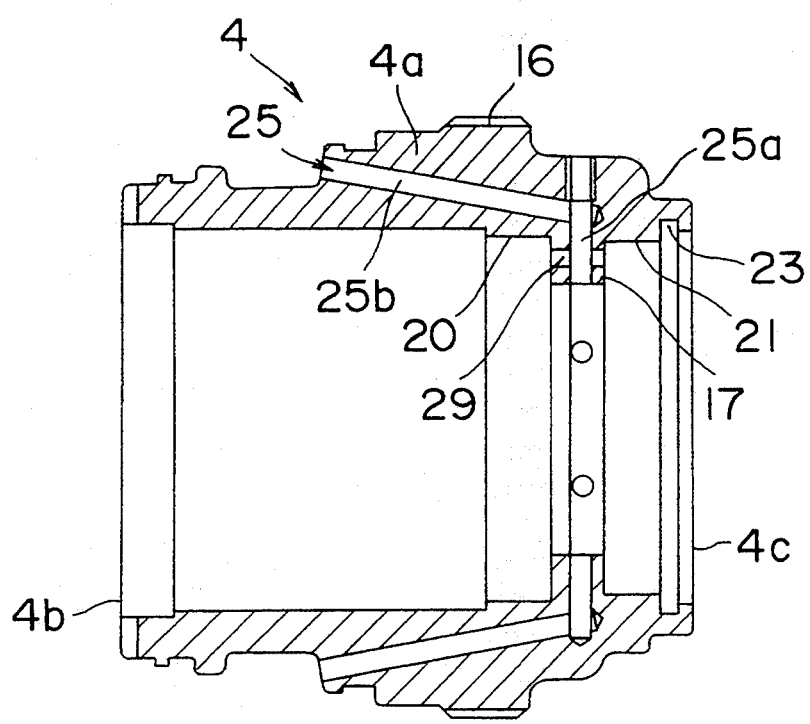
FIG. 2 is an enlarged cross-sectional view showing a cap composing the master cylinder shown in FIG. 1.
Figure 3:
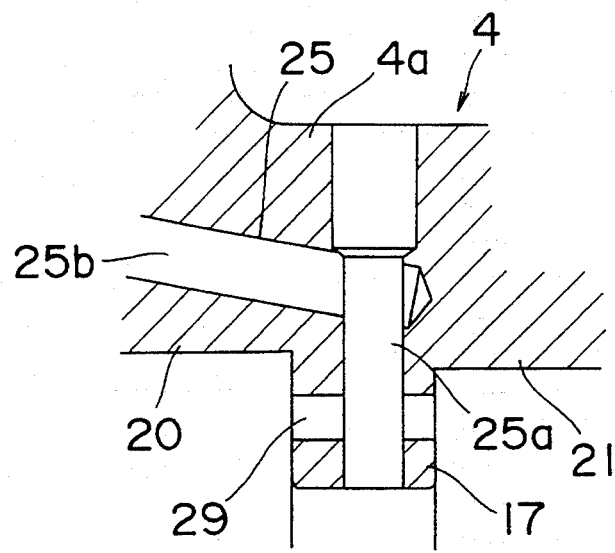
FIG. 3 is an enlarged cross-sectional view of the main part of the cap shown in FIG. 2.
Figure 4:
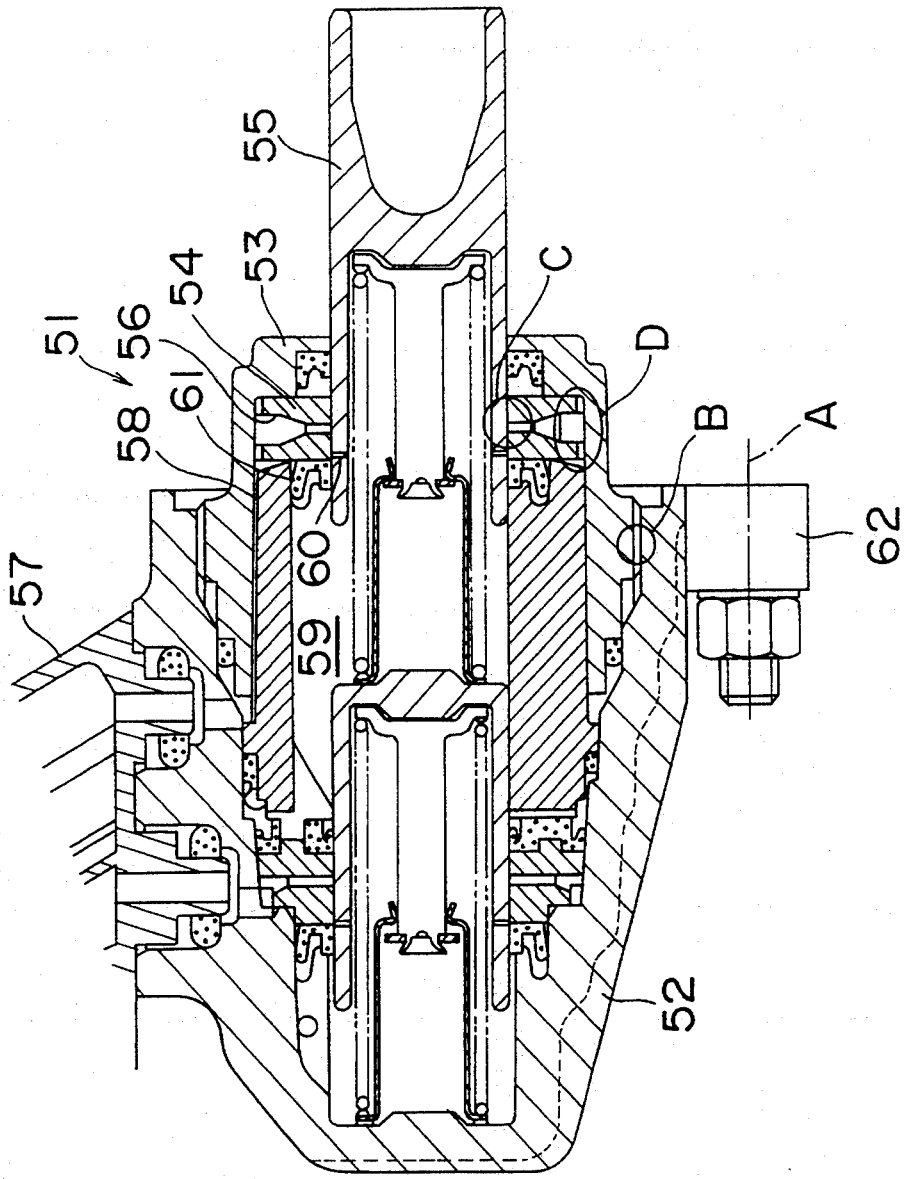
FIG. 4 is a cross-sectional view of a conventional master cylinder.

FIGS. 1 to 3 show one embodiment of the master cylinder in accordance with the present invention.

In FIG. 1, reference numeral 1 denotes a tandem master cylinder. A housing 2 of the master cylinder 1 comprises a body 3 having an opening 3a at one end and a cap 4 screwed into the opening of the body 3. Within the cylinder housing 2, a piston guide section and a ring-shaped piston guide 5, which are described in detail later, are disposed with a fixed space between them. Pistons 6 and 7 are inserted into the piston guide section and the piston guide 5. These pistons 6 and 7 are guided and supported by the piston guide section and the piston guide 5, and slidably housed in the cylinder housing 2.

Two pressure chambers 8 and 9 are defined in the cylinder housing 2 by the piston guide section, the piston guide 5, and the pistons 6 and 7. In one pressure chamber 8, a cylindrical sleeve 10 having the inner peripheral surface formed into spline shape is disposed. The pistons 6 and 7 are also guided by the sleeve 10. In the pressure chambers 8 and 9, spring mechanisms 11 and 12 for energizing the pistons 6 and 7 to return them to the original positions are disposed, respectively. These spring mechanisms 11 and 12 are interposed between the pistons 6 and 7 and between the piston 7 and the body 3, respectively. The pistons 6 and 7 have concave portions 6a and 7a having an opening on the tip end side, respectively. Through holes 13 and 14 are formed on the peripheral walls of the concave portions 6a and 7a, respectively.

The aforementioned cap 4 is shaped substantially into a cylinder having a thick-wall portion 4a. On the outer peripheral surface of the thick-wall portion 4a, an external thread portion 16 is disposed to engage with an internal thread portion 15 of the body 3. On the inner peripheral surface of the cap 4, a piston guide section 17 extending in the radial direction is formed integrally. The piston guide section 17 is disposed on the opening end side opposite to the pressure chamber 8. At both left and right sides of the piston guide section 17, annular notches 20 and 21 are formed to hold annular seal members 18 and 19. Therefore, the annular seal members 18 and 19, which are inserted from left and right opening ends 4b and 4c, respectively, fit into the notches 20 and 21 on the inner peripheral surface of the cap 4, and are brought into contact with the left and right end surfaces of the piston guide section 17.

At the notch 21 side of the cap 4, a circumferential groove 23 is formed to fit a snap ring 22, so that the snap ring 22 fitted in the circumferential groove 23 prevents the annular seal member 19 from coming off from the opening end 4c of the cap 4. An annular seal member 24 is also disposed on the end surface on the pressure chamber 9 side of the piston guide 5.

In the thick-wall portion 4a of the cap 4 is formed an inlet passage 25 consisting of a vertical passage 25a and an inclined passage 25b. The vertical passage 25a of the inlet passage 25 is disposed in the radial direction from the piston guide section 17 toward the outer peripheral surface of the thick-wall portion 4a. One end of the vertical passage 25a is open on the sliding surface of the piston 6, and the other end thereof communicates with one end of the inclined passage 25b. The inclined passage 25b is formed in a downward inclined manner from the position near the outer peripheral surface of the thick-wall portion 4a to the other end of the vertical passage 25a. The other end of the inclined passage 25b communicates with an oil reservoir 26, which is described in detail later. Therefore, the pressure chamber 8 is in communication with the oil reservoir 26 via the through hole 13 in the piston 6 and the inlet passage 25.

The piston guide 5 has a vertical hole 27 formed in the radial direction. One end of the vertical hole 27 is open on the sliding surface of the piston 7, and the other end thereof communicates with an inlet passage 28 formed in the cylinder housing 2. Therefore, the pressure chamber 9 is in communication with the oil reservoir 26 via the vertical hole 27 in the piston guide 5 and the inlet passage 28. The piston guide section 17 and the piston guide 5 have horizontal holes 29 and 30 for preventing negative pressure, respectively, so that oil flows via the horizontal holes 29 and 30 while pressing the annular seal members 18 and 24 when the pressure is negative.

The aforementioned oil reservoir 26 is fixed to the body 3 of the cylinder housing 2. At the bottom of the oil reservoir 26 are formed passages 31 and 32. These passages 31 and 32 communicate with the inlet passages 25 and 28 via the holes 33 and 34 in the body 3, respectively. On the internal wall surface of the body 3 are disposed delivery ports 35 and 36. The pressure chambers 8 and 9 are in communication with a not illustrated brake system (e.g., a wheel cylinder) via these delivery ports 35 and 36. On the outer peripheral surface of the body 3 is installed a mount 38 for installing the master cylinder 1 to a brake booster 37, which is a mating member. When the master cylinder 1 is installed to the brake booster 37, the mount 38 of the body 3 is fixed to the side of the brake booster 37 by fastening with bolts 39 and nuts 40.

With the master cylinder 1 thus constructed, when a pressure is applied to the piston 6 via the brake booster 37 by depressing a brake pedal, the pistons 6 and 7 are moved under pressure in the left direction in FIG. 1, so that the through holes 13 and 14 are closed by the annular seal members 18 and 24, respectively. In this condition, the through holes 13 and 14 are isolated from the vertical passage 25a of the inlet passage 25 and the vertical hole 27 in the piston guide 5, so that communication between the pressure chambers 8 and 9 and the oil reservoir 26 is cut off. Therefore, when the pistons 6 and 7 are pushed into the pressure chambers 8 and 9, respectively, the oil in the pressure chambers 8 and 9 is supplied to the not illustrated brake system from the delivery ports 35 and 36 corresponding to the pushed amount of the pistons 6 and 7.

When the brake pedal is released, the pistons 6 and 7 are moved to the right by the energizing force of the spring mechanisms 11 and 12, respectively, and return to the original positions. Accordingly, the through holes 13 and 14 coincide with the vertical passage 25a of the inlet passage 25 and the vertical hole 27 in the piston guide 5, respectively, so that the pressure chambers 8 and 9 communicate with the oil reservoir 26 via the through holes 13 and 14, the inlet passage 25, the vertical hole 27, etc., by which the pressure is relieved. In this condition, therefore, no pressure is applied to the not illustrated brake system.

In this embodiment, the piston guide section 17 is formed integrally on the inner peripheral surface of the cap 4. Therefore, the clearances associating with the concentricity are formed only at three points: position A where the brake booster 37 is installed to the mount 38 of the body 3, position B where the external thread portion 16 of the cap 4 engages with the internal thread portion 15 of the body 3, and position C where the outer peripheral surface of the piston 6 slides on the inner peripheral surface of the piston guide section 17. As a result, the concentricity can be easily achieved in installing the master cylinder 1 to the brake booster 37, as compared with the conventional type having four points of clearances. Also, since the cap 4 of this embodiment has the inlet passage 25 consisting of the vertical passage 25a extending in the radial direction and the inclined passage 25b which is inclined downward, which is formed in the thick-wall portion 4a, the inlet passage 25 can be located close to the oil reservoir 26, so that the response of the master cylinder 1 is improved.

Although one embodiment of the present invention has been described above, the present invention is not limited to this embodiment, and various changes and modifications may be made in light of the above teachings.

I claim:

1. In a master cylinder including a cylinder housing having a hollow interior with an opening at one end thereof, a hollow cylindrical cap extending into said hollow interior of said housing and threadably connected to said housing adjacent said opening, a piston guide in said housing, a piston extending into said cap and supported and guided by said piston guide for reciprocating movement in said housing, a pressure chamber in said housing formed by said piston and said hollow cylindrical cap, a fluid reservoir mounted on said housing, an outer circumferential surface on said piston, a hole through said outer circumferential surface of said piston for communicating said pressure chamber with said reservoir at a predetermined position of said piston in said housing, a piston guide sleeve mounted in said housing and having an inner surface engaging said outer circumferential surface of said piston guide for guiding and supporting said piston, a primary seal disposed in said housing for sealing said outer circumferential surface of said piston, outlet means in said housing communicating said pressure chamber to an operating system, so that when said piston is displaced from said predetermined position thereof toward said interior of said housing said hole passes into said primary seal to interrupt communication between said pressure chamber and said reservoir through said hole and fluid pressure in said pressure chamber is applied through said outlet means to said operation system, the improvement comprising:

an inner circumferential surface on said cap;

said piston guide being integral with said cap and extending radially inwardly from said inner circumferential surface on said cap;

an inner circumferential guiding surface on said piston guide slidably engaging said outer circumferential surface on said piston;

a fluid passage extending through said cap and piston guide having an inner end communicating through said inner guiding surface with said outer circumferential surface of said piston and an outer end communicating with said reservoir;

an outer circumferential surface on said piston guide sleeve engaging said inner circumferential surface on said cap; and a primary seal recess in said inner circumferential surface on said cap for receiving said primary seal in an inserted position therein, so that said hole in said piston communicates with said inner end of said fluid passage in said cap at said outer circumferential surface of said piston when said piston is in said predetermined position.

2. The master cylinder as claimed in claim 1 wherein:

said piston guide has an inner side facing said pressure chamber;

said primary seal recess is adjacent said inner side of said piston guide;

said cap has a cylindrical portion extending into said interior or said housing; and said inner circumferential surface is on said cylindrical portion of said cap.

3. The master cylinder as claimed in claim 2 wherein:

said pressure chamber is demarcated by said piston, said inner circumferential surface on said cap and said primary seal.

4. The master cylinder as claimed in claim 3 wherein:

an outer end surface is provided on said piston guide sleeve; and said primary seal is disposed in sealing relationship between said inner side of said piston guide and said outer end surface of said sleeve.

5. The master cylinder as claimed in claim 4 and further comprising:

an outer side on said piston guide facing in a direction opposite to said inner surface on said piston guide and away from said pressure chamber; and a secondary seal between said cap and said outer cylindrical surface of said piston and disposed at said outer side of said piston guide.

6. The master cylinder as claimed in claim 5 and further comprising:

a retainer means mounted in said cap for retaining said secondary seal against said outer side of said piston guide.

7. The master cylinder as claimed in claim 6 wherein:

said fluid passage in said cap comprises a radially outwardly extending portion extending from said inner end of said fluid passage; and an inclined portion inclined radially outwardly from said radial portion.

8. The master cylinder as claimed in claim 4 wherein:

said fluid passage in said cap comprises a radially outwardly extending portion extending from said inner end of said fluid passage; and an inclined portion inclined radially outwardly from said radial portion.

9. The master cylinder as claimed in claim 3 wherein:

said fluid passage in said cap comprises a radially outwardly extending portion extending from said inner end of said fluid passage; and an inclined portion inclined radially outwardly from said radial portion.

10. The master cylinder as claimed in claim 2 and further comprising:

an outer side on said piston guide facing in a direction opposite to said inner surface on said piston guide and away from said pressure chamber; and a secondary seal between said cap and said outer cylindrical surface of said piston and disposed at said outer side of said piston guide.

11. The master cylinder as claimed in claim 10 and further comprising:

a retainer means mounted in said cap for retaining said secondary seal against said outer side of said piston guide.

12. The master cylinder as claimed in claim 11 wherein:

said fluid passage in said cap comprises a radially outwardly extending portion extending from said inner end of said fluid passage; and an inclined portion inclined radially outwardly from said radial portion.

13. The master cylinder as claimed in claim 10 wherein:

said pressure chamber is demarcated by said piston, said inner circumferential surface on said cap and said primary seal.

14. The master cylinder as claimed in claim 6 wherein:

said fluid passage in said cap comprises a radially outwardly extending portion extending from said inner end of said fluid passage; and an inclined portion inclined radially outwardly from said radial portion.

15. The master cylinder as claimed in claim 2 wherein:

said fluid passage in said cap comprises a radially outwardly extending portion extending from said inner end of said fluid passage; and an inclined portion inclined radially outwardly from said radial portion.

16. The master cylinder as claimed in claim 1 wherein:

said fluid passage in said cap comprises a radially outwardly extending portion extending from said inner end of said fluid passage; and an inclined portion inclined radially outwardly from said radial portion.

* * * * *